United States Patent
Nataraj

(10) Patent No.: US 12,417,388 B1
(45) Date of Patent: Sep. 16, 2025

(54) HARDWARE IMPLEMENTATIONS OF ACTIVATION FUNCTIONS IN NEURAL NETWORKS

(71) Applicant: Bindiganavale S. Nataraj, Cupertino, CA (US)

(72) Inventor: Bindiganavale S. Nataraj, Cupertino, CA (US)

( * ) Notice: Subject to any disclaimer, the term of this patent is extended or adjusted under 35 U.S.C. 154(b) by 1286 days.

(21) Appl. No.: 17/083,186

(22) Filed: Oct. 28, 2020

Related U.S. Application Data

(60) Provisional application No. 63/034,907, filed on Jun. 4, 2020.

(51) Int. Cl.
*G06N 3/084* (2023.01)
*G06N 3/04* (2023.01)

(52) U.S. Cl.
CPC .............. *G06N 3/084* (2013.01); *G06N 3/04* (2013.01)

(58) Field of Classification Search
CPC ............ G06N 3/084; G06N 3/04; G06N 3/08; G06N 3/06; G06N 3/063
See application file for complete search history.

(56) References Cited

U.S. PATENT DOCUMENTS

| | | | |
|---|---|---|---|
| 2017/0103321 A1* | 4/2017 | Henry | G06N 3/04 |
| 2019/0325289 A1* | 10/2019 | Cammarota | G06N 3/04 |
| 2020/0074293 A1* | 3/2020 | Chin | G06N 3/04 |
| 2020/0327271 A1* | 10/2020 | Langhammer | G06N 3/063 |
| 2021/0232899 A1* | 7/2021 | Takamaeda | G06N 3/045 |
| 2021/0304010 A1* | 9/2021 | Sengupta | G06N 3/04 |

* cited by examiner

*Primary Examiner* — Kamran Afshar
*Assistant Examiner* — Brian J Hales
(74) *Attorney, Agent, or Firm* — Huse IP Law; Charles C. Huse

(57) ABSTRACT

Circuitry for performing neural-network calculations includes a plurality of compute circuits, arranged in parallel with respective inputs and outputs, to receive function arguments for a node of a neural network on their respective inputs, compute values of a plurality of activation functions using the function arguments, and provide the values on their respective outputs. Each compute circuit of the plurality of compute circuits is to compute the values of a respective activation function of the plurality of activation functions. The circuitry also includes a multiplexor to select between the respective outputs of the plurality of compute circuits and to provide the values on a selected output as activation-function values for the node of the neural network, based on an activation-function selection signal.

18 Claims, 6 Drawing Sheets

HARDWARE IMPLEMENTATIONS OF ACTIVATION FUNCTIONS IN NEURAL NETWORKS

RELATED APPLICATION

This application claims priority to U.S. Provisional Patent Application No. 63/034,907, filed on Jun. 4, 2020, which is incorporated by reference in its entirety.

TECHNICAL FIELD

This disclosure relates to neural networks, and more specifically to computing activation functions in neural networks.

BACKGROUND

Neural networks use activation functions repeatedly, both for training and in deployment. Activation functions are traditionally computed by software running on a server in the cloud.

SUMMARY

There is a need for techniques for computing activation functions in a quick, computationally efficient, and low-power manner.

In some embodiments, circuitry includes a plurality of compute circuits, arranged in parallel and having respective inputs and outputs, to receive function arguments for a node of a neural network on their respective inputs, compute values of a plurality of activation functions using the function arguments, and provide the values on their respective outputs. Each compute circuit of the plurality of compute circuits is to compute the values of a respective activation function of the plurality of activation functions. The circuitry also includes a multiplexor to select between the respective outputs of the plurality of compute circuits and to provide the values on a selected output as activation-function values for the node of the neural network, based on an activation-function selection signal.

In some embodiments, a method of performing neural-network calculations includes providing a function argument for a node of a neural network to one or more compute circuits of a plurality of compute circuits. The plurality of compute circuits is arranged in parallel and has respective inputs and outputs. Each compute circuit of the plurality of compute circuits is configured to compute a value of a respective activation function of a plurality of activation functions using the function argument. The method also includes selecting an output of a respective compute circuit of the plurality of compute circuits, based on an activation-function selection signal, and providing a value on the selected output as an activation-function value for the node of the neural network.

BRIEF DESCRIPTION OF THE DRAWINGS

For a better understanding of the various described implementations, reference should be made to the Detailed Description below, in conjunction with the following drawings.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
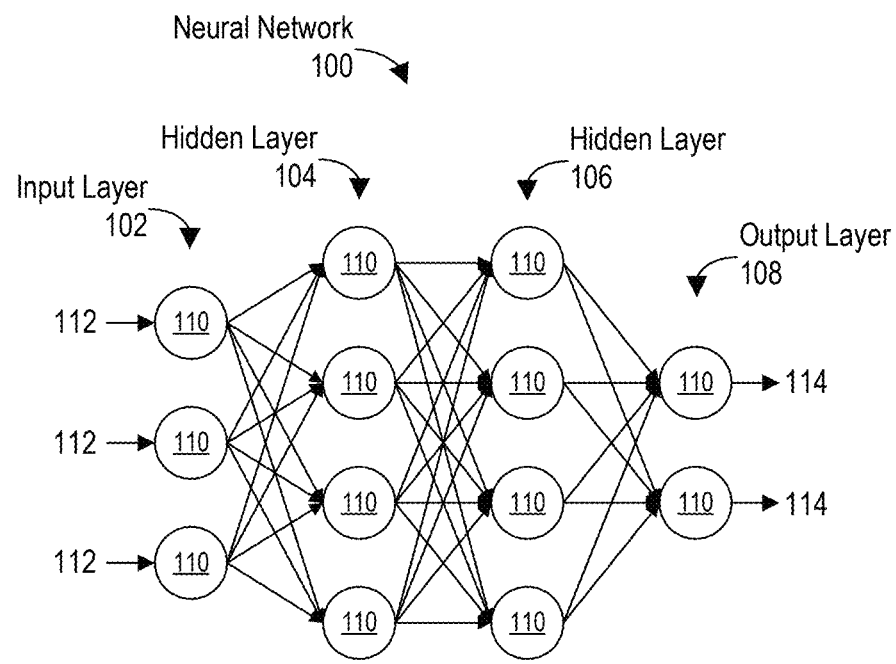
FIG. 1 shows a neural network.

FIG. 1 shows a neural network 100. The neural network 100 includes a plurality of nodes 110 divided into layers. The nodes 110 may also be referred to as neurons. The layers include an input layer 102, first hidden layer 104, second hidden layer 106, and output layer 108. Each layer may have multiple nodes 110. The neural network 100 as shown in FIG. 1 is an example of a deep neural network, because it has multiple hidden layers between the input layer 102 and output layer 108. In some embodiments, the neural network 100 has more than two hidden layers (e.g., has three hidden layers). In some embodiments, the neural network 100 only has a single hidden layer, such that it is not a deep neural network. The nodes 110 of the input layer 102 receive input values 112 (i.e., input data) on respective inputs. The input values 112 are the input values for the neural network 100. The nodes 110 of the following layers have inputs that receive input values (i.e., input data) from the nodes 110 of previous layers. For example, the nodes 110 of the first hidden layer 104 receive input values from the nodes 110 (e.g., each node 110) of the input layer 102, the nodes 110 of the second hidden layer 106 receive input values from the nodes 110 (e.g., each node 110) of the first hidden layer 104, and the nodes 110 of the output layer 108 receive input values from the nodes 110 (e.g., each node 110) of the second hidden layer 106. The nodes 110 of the output layer 108 provide respective output values 114 on respective outputs. The output values 114 are the output values for the neural network 100.

Figure 2:
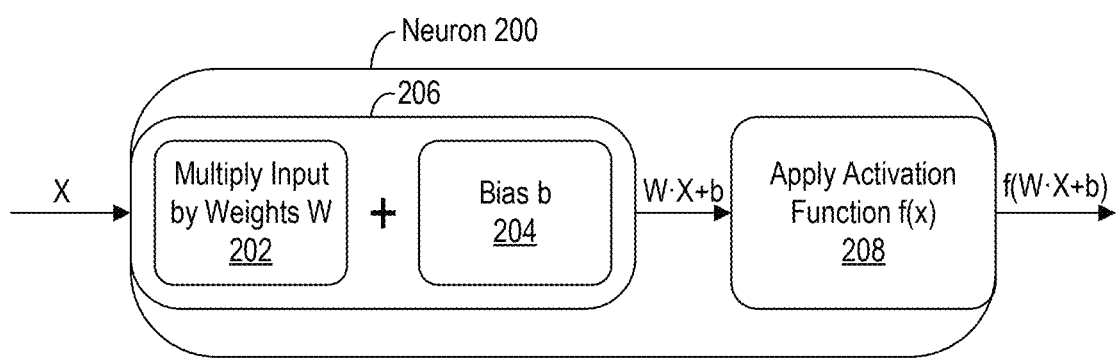
FIG. 2 is a functional block diagram of a neuron in a neural network.

FIG. 2 is a functional block diagram of a neuron 200 in a neural network. The neuron 200 may be an example of each node 110 in the neural network 100 (FIG. 1). Assuming the neuron 200 is in a hidden layer (e.g., hidden layer 104 or 106, FIG. 1) or output layer (e.g., output layer 108, FIG. 1), the neuron 200 receives a vector X that includes values from the outputs of the neurons (e.g., each neuron) in a previous layer of the neural network to which the inputs of the neuron 200 are coupled. (If the neuron 200 is in the input layer 102, it may have a single input 102 that receives input values.) A multiplication module 202 multiplies the vector X by a vector of weights W, to produce the product W·X. Each weight in the vector W is for a respective input of the neuron 200, and thus corresponds to (i.e., weights) values from a respective neuron in the previous layer of the neural network. An addition module 204 adds a bias b to the product W·X, to produce the sum W·X+b. The multiplication module 202 and the addition module 204 compose a module 206 that receives the vector X and provides W·X+b. An activation-function module 208 computes an activation function f(x), using W·X+b, as received from the module 206, as the argument x. The value of the activation function f(x), as computed using W·X+b as the argument x, is provided on an output for the neuron 200.

The activation function f(x) may be linear or non-linear. Different layers in a neural network may use different activation functions. Some layers in a neural network may use the same activation functions, while other layers in the neural network may use a different activation function.

A neural network (e.g., the neural network 100, FIG. 1) (e.g., with neurons 200 as nodes) may operate in two modes: a training mode and an operating mode. The operating mode is used after the neural network has been trained and deployed. During the training mode (e.g., during neural-network training 500, FIG. 5, such as neural-network training 600, FIG. 6), weights and biases are determined iteratively, by comparing outputs of the neural network to expected outputs and updating the weights and biases accordingly. During the operating mode, the weights and biases remain fixed, and the neural network provides outputs based on given inputs. A layer may use the same activation function in the operating mode as in the training mode, or may use a different activation function in the operating mode than in the training mode. The activation function used for a layer may be changed in the operating mode (i.e., once the neural network has been deployed). For example, after training, a neural network may be deployed such that a particular layer uses a particular activation function in the operating mode. The neural network may subsequently be changed so that the particular layer uses a different activation function in the operating mode. The weights and bias, however, remain unchanged; they are only changed during the training mode.

Figure 3:
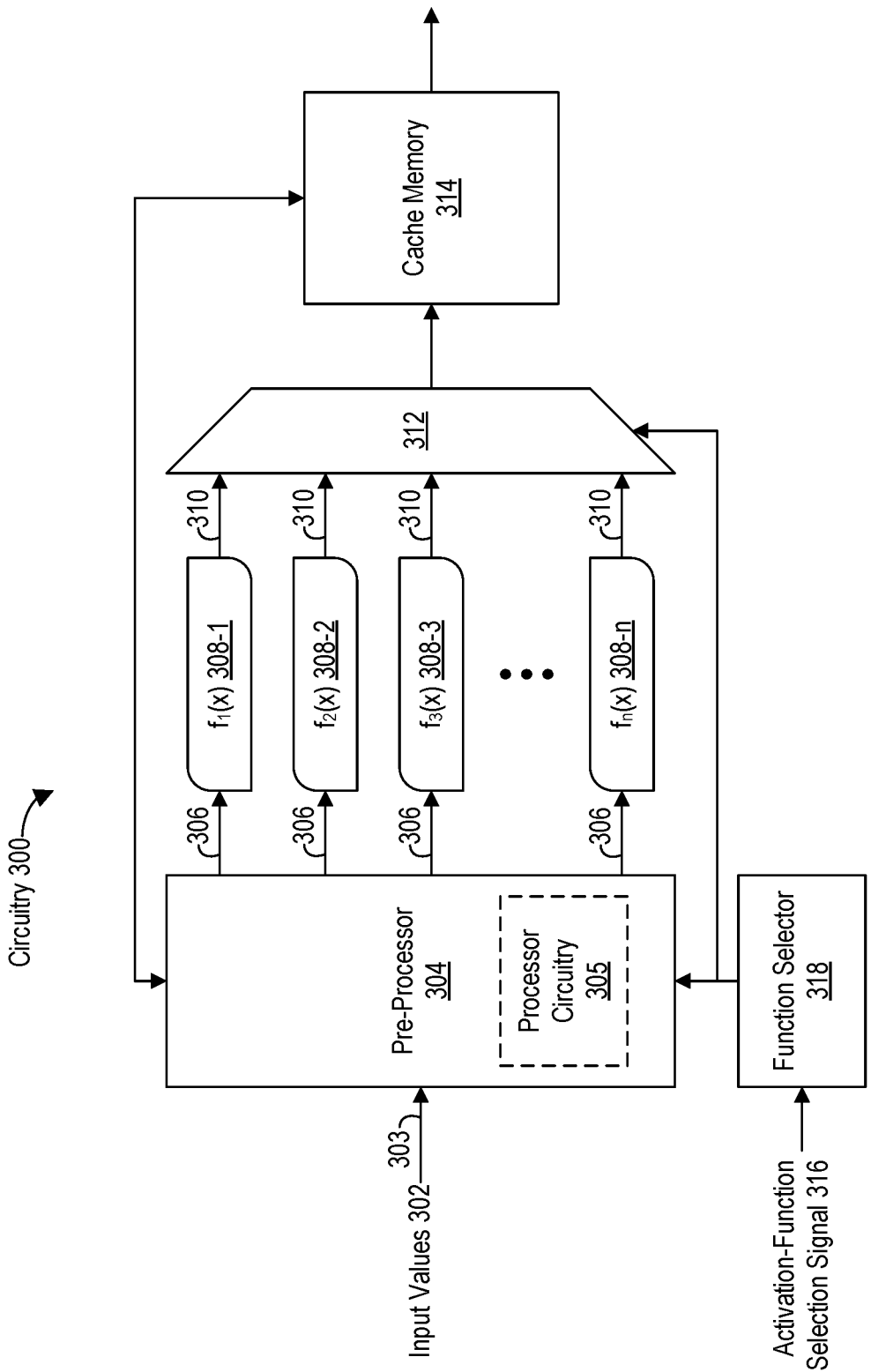
FIG. 3 is a block diagram of circuitry to perform computations for a node in a neural network, in accordance with some embodiments.

FIG. 3 is a block diagram of circuitry 300 to perform computations for a node 110 (FIG. 1) (e.g., for the neuron 200, FIG. 2) in accordance with some embodiments. The circuitry 300 includes a plurality of compute circuits 308-1 through 308-$n$ arranged in parallel. Each of the compute circuits 308 is configured to compute values of a respective activation function f(x). For example, a first compute circuit 308-1 is configured to compute values of a first activation function $f_1(x)$, a second compute circuit 308-2 is configured to compute values of a second activation function $f_2(x)$, a third compute circuit 308-3 is configured to compute values of a third activation function $f_3(x)$, and an nth compute circuit 308-$n$ is configured to compute values of an nth activation function $f_n(x)$, where n is an integer greater than one. Each of the compute circuits 308 has a respective input 306 and a respective output 310. The inputs 306 receive function arguments, which the compute circuits 308 use as arguments to compute respective activation-function values. The respective activation-function values are provided on respective outputs 310.

The activation functions computed by the compute circuits 308 may be linear and/or non-linear functions. Examples of activation functions that may be computed by respective compute circuits 308 include, without limitation, a sigmoid function, a hyperbolic tangent function, a rectified linear unit (ReLU) function, a leaky ReLU function, a max-pooling function, an average-pooling function, and a zero-activation function. The max-pooling and average-pooling functions are used to down-sample matrices by selecting maximum or average values from portions of the matrices. The zero-activation function provides all zeros. A respective compute circuit 308 (e.g., as designed using register-transfer level (RTL) digital logic) may include a multiply-accumulate unit to generate an activation function (e.g., a non-linear activation function) by calculating a Taylor-series approximation of the activation function. For example, a first compute circuit 308 may include a multiply-accumulate unit to generate a sigmoid function by calculating its Taylor-series approximation, and/or a second compute circuit 308 may include a multiply-accumulate unit to generate a hyperbolic tangent function by calculating its Taylor-series approximation.

Figure 4:
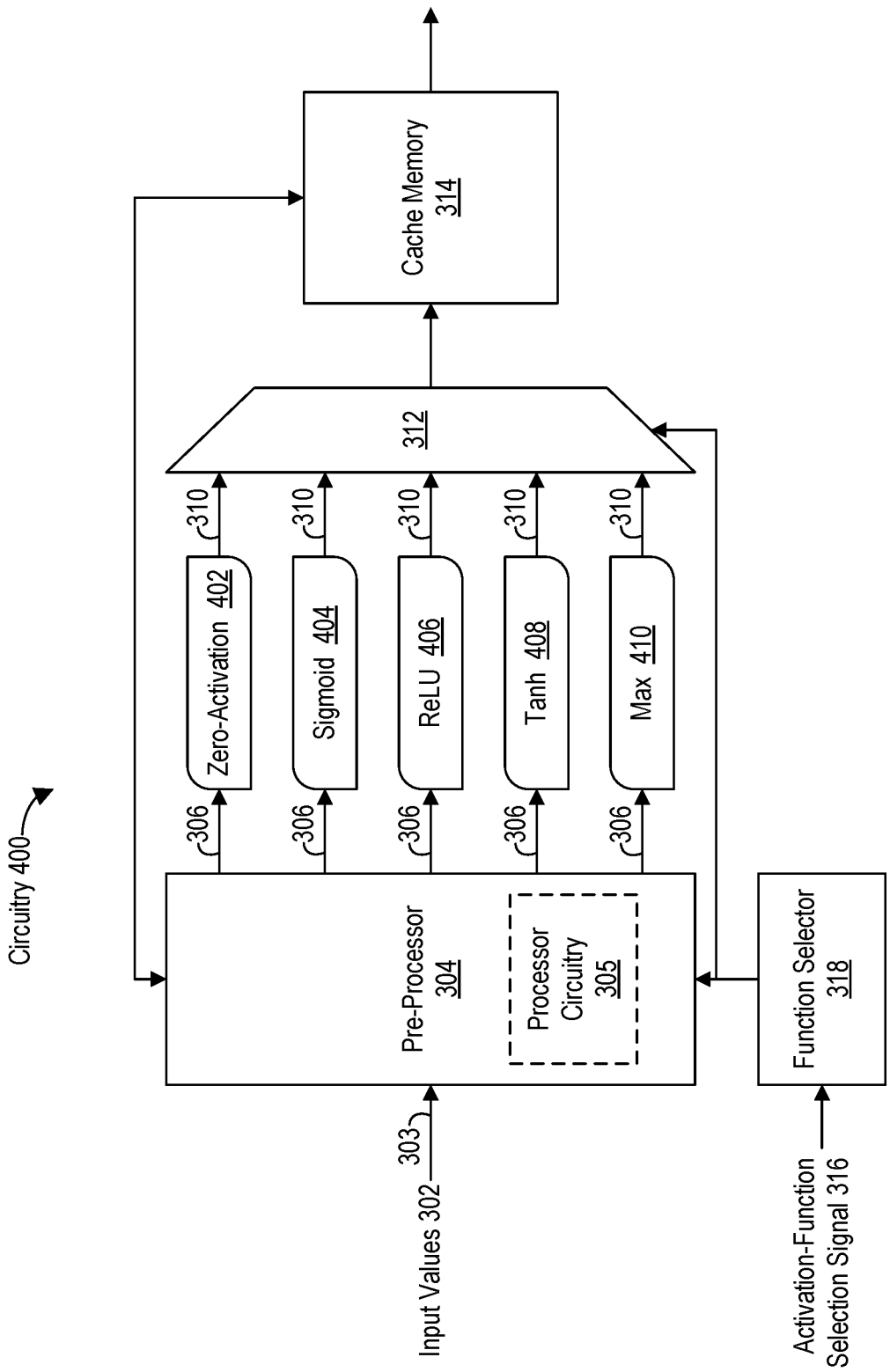
FIG. 4 is a block diagram of an example of the circuitry of FIG. 3, in accordance with some embodiments.

FIG. 4 is a block diagram of circuitry 400 that is an example of the circuitry 300 (FIG. 3) in accordance with some embodiments. The circuitry 400 includes a compute circuit 402 to compute a zero-activation function, a compute circuit 404 to compute a sigmoid function, a compute circuit 406 to compute a ReLU function, a compute circuit 408 to compute a hyperbolic tangent (tan h) function, and a compute circuit 410 to compute a max-pooling (max) function. The compute circuits 402, 404, 406, 408, and 410 are an example of the compute circuits 308-1 through 308-$n$ (FIG. 3) (in this example, n equals 5) and are arranged in parallel. Numerous other examples of the compute circuits 308-1 through 308-$n$ are possible.

The circuitry 300 (FIG. 3) (e.g., the circuitry 400, FIG. 4) also includes a multiplexor 312, which has inputs connected to the outputs 310. The multiplexor 312 selects between the outputs 310 of the compute circuits 308 and provides the values on the selected output 310 as activation-function values for the node 110, based on an activation-function selection signal 316. The activation-function selection signal 316 may be provided to a function-selector circuit 318, coupled to the multiplexor 312, which forward the activation-function selection signal 316 or provides a corresponding signal to the multiplexor 312. The activation-function selection signal 316 specifies the output 310 to be selected by the multiplexor 312, and thereby specifies the activation function to be used for the node 110.

In some embodiments, the circuitry 300 (e.g., the circuitry 400, FIG. 4) further includes a pre-processor 304 that provides the function arguments to the respective inputs 306 of the plurality of compute circuits 308. The compute circuits 308 are arranged in parallel between the pre-processor 304 and the multiplexor 312. The pre-processor 304 may provide a particular function argument to each input 306 of the plurality of compute circuits 308, which may operate simultaneously to produce respective values. The multiplexor 312, by selecting a respective output 310, effectively selects the compute circuit 308 that provides the result for the node 110 (i.e., provides for the node 110 the activation-function value corresponding to the particular function argument).

Alternatively, the pre-processor 304 may include a de-multiplexor that provides a respective function argument to a respective input 306 of a selected compute circuit 308, based on the activation-function selection signal 316. The function-selector circuit 318 may be coupled to the de-multiplexor to forward the activation-function selection signal 316, or a corresponding signal, to the de-multiplexor. The de-multiplexor does not provide the respective function argument to inputs 306 of the other, unselected compute circuits 308, which may be disabled (e.g., placed in a low-power state) while the selected compute circuit 308 computes an activation-function value using the respective function argument. The multiplexor 312 selects the output 310 of the selected compute circuit 308 based on the activation-function selection signal 316 (or a corresponding signal) and provides the activation-function value computed by the selected compute circuit 308 as the activation-function value for the node 110.

The pre-processor 304 may receive input data 302 (i.e., input values) for the node 110 on an input 303 and may include processor circuitry 305 to generate the function arguments using the input data 302, weights for the node 110, and a bias for the node 110. The input data 302 may come from the nodes 110 in a preceding layer of the neural network. For example, the processor circuitry 305 implements the functionality of the module 206 (FIG. 2): it calculates W·X+b, given vector X as the input data 302, and provides W·X+b to one or more of the inputs 306 (e.g., to the input 306 of a selected compute circuit 308, or to all of the inputs 306). In some embodiments, the processor circuitry 305 includes a processor core (e.g., a central-processing-unit (CPU) core, graphics-processing-unit (GPU) core, or microcontroller core) and memory (e.g., non-volatile memory that serves as a non-transitory computer-readable medium) storing instructions (e.g., one or more programs) for execution by the processor core to calculate the function arguments. The memory may be embedded in and/or separate from the processor core. In some embodiments, the processor circuitry 305 includes an arithmetic logic unit (ALU) and associated state machine.

In some embodiments, the circuitry 300 (e.g., the circuitry 400, FIG. 4) includes a cache memory 314 coupled to the multiplexor 312 (e.g., to the output of the multiplexor 312) and the pre-processor 304. The cache memory 314 may store activation-function values. For example, activation-function values (e.g., as received from the multiplexor 312) may be stored in the cache memory 314 in association with indicators of respective neurons 110 and/or layers for the activation-function values. The cache memory 314 may also, or alternatively, store the weights and bias for the node 110. For example, the pre-processor 304 (e.g., the processor circuitry 305) may cache the weights and the bias (e.g., W and b) for the node 110 in the cache memory 314 and retrieve the weights and the bias from the cache memory 314 when needed (e.g., to implement the functionality of module 206, FIG. 2). The pre-processor 304 (e.g., the processor circuitry 305) may update the weights and the bias during training (e.g., during backward propagation 514, as described below for FIGS. 5 and 6) and cache the updated weights and the updated bias in the cache memory 314. The circuitry 300 may be used for multiple nodes 110 (e.g., neurons 200), and the weights and bias for each node 110 may be cached in the cache memory 314 and retrieved from the cache memory 314 to perform computations for that node 110.

The cache memory 314 may be used to implement skip connections in the neural network. In a skip connection, an activation-function value from a layer (e.g., layer m, where m is an integer indexing the layer) bypasses the next layer (i.e., layer m+1) and is provided to a subsequent layer (e.g., the layer following the next layer, which is layer m+2). This activation-function value may be cached in the cache 314 and then retrieved from the cache 314 as one of the input values provided to the subsequent layer.

In some embodiments, the circuitry 300 is used for each node 110 in a layer (e.g., input layer 102, hidden layer 104 or 106, or output layer 108, FIG. 1) of a neural network (i.e., for all of the nodes 110 in the layer). The layer has a plurality of nodes 110, and the circuitry 300 is used for all of those nodes 110. The pre-processor 304 provides function arguments for the plurality of nodes 110 in the layer to one or more compute circuits 308 (e.g., to a single compute circuit 308, or to all of the compute circuits 308) of the plurality of compute circuits 308-1 through 308-n. The processor circuit 305 may generate the function arguments for all of the nodes 110 in the layer.

In some embodiments, the circuitry 300 is used for a subset of the nodes 110 in a layer (e.g., input layer 102, hidden layer 104 or 106, or output layer 108, FIG. 1) of a neural network. The layer has a plurality of nodes 110, and the circuitry 300 is used for a subset (e.g., two or more) of those nodes 110. The pre-processor 304 provides function arguments for the subset to one or more compute circuits 308 (e.g., to a single compute circuit 308, or to all of the compute circuits 308) of the plurality of compute circuits 308-1 through 308-n. The processor circuit 305 may generate the function arguments for the subset.

In some embodiments, the circuitry 300 is used for each node 110 in two or more layers (e.g., input layer 102, hidden layer 104 and/or 106, and/or output layer 108, FIG. 1) (e.g., in every layer) of a neural network (i.e., for all of the nodes in each of the two or more layers) (e.g., for each node in every layer). Each of the two or more layers has a respective plurality of nodes 110, and the circuitry 300 is used for all of those nodes 110. The pre-processor 304 provides function arguments for the respective pluralities of nodes 110 in the two or more layers to one or more compute circuits 308 (e.g., to a single compute circuit 308 for each layer, or to all of the compute circuits 308) of the plurality of compute circuits 308-1 through 308-n. The processor circuit 305 may generate the function arguments for all of the nodes 110 in the two or more layers.

Figure 5:
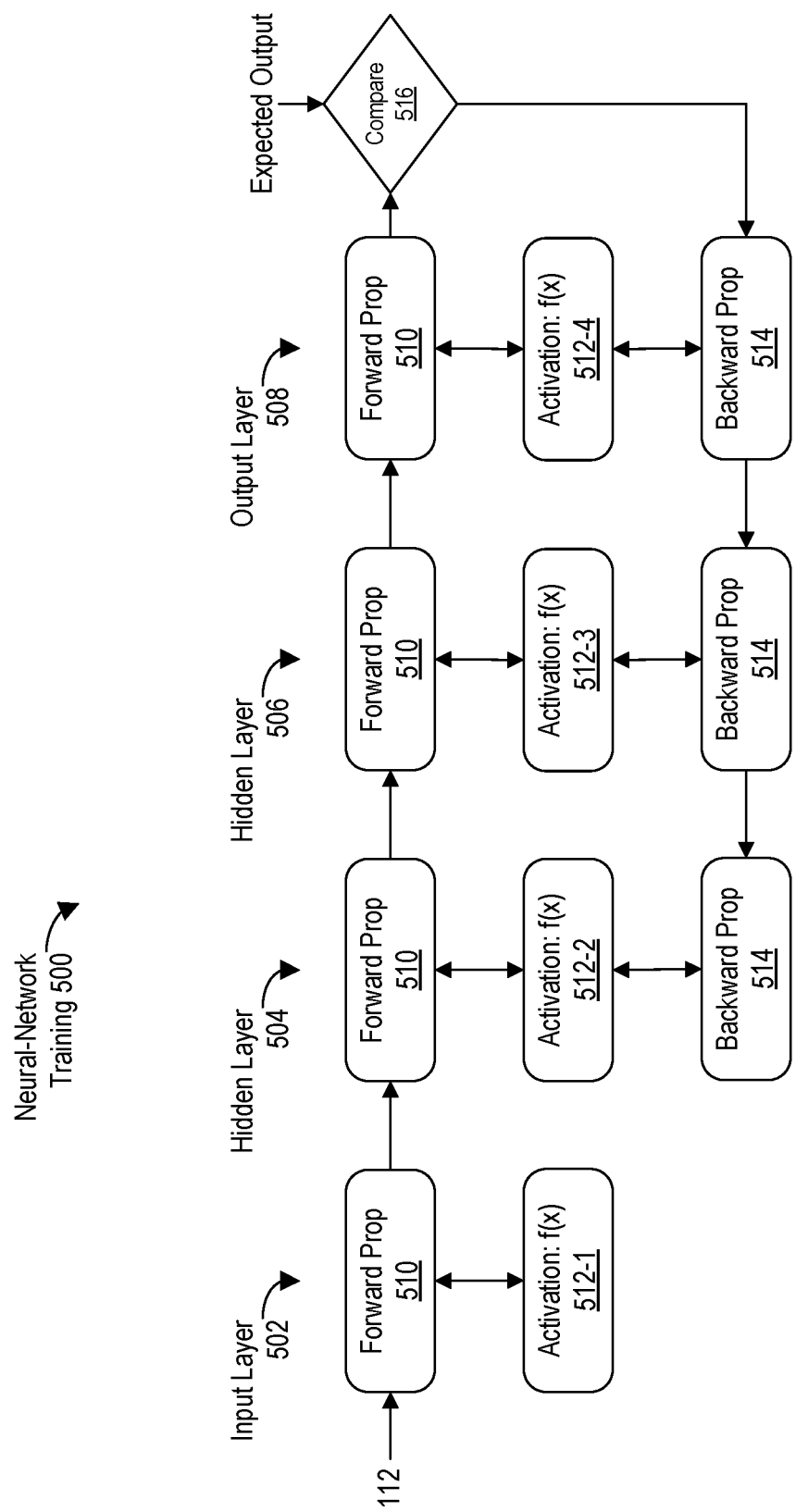
FIG. 5 shows neural-network training for a deep neural network in accordance with some embodiments.

FIG. 5 shows neural-network training 500 for a deep neural network (e.g., neural network 100, FIG. 1) in accordance with some embodiments. (Similar training may be performed for neural networks that are not deep.) The deep neural network includes an input layer 502 (e.g., input layer 102, FIG. 1), hidden layers 504 and 506 (e.g., hidden layers 104 and 106, FIG. 1), and output layer 508 (e.g., output layer 108, FIG. 1). Each of these layers has a plurality of nodes 110 (FIG. 1) (e.g., neurons 200, FIG. 2), which are not shown in FIG. 5 for simplicity. The neural-network training 500 includes two procedures, forward propagation 510 and backward propagation 514, that are performed repeatedly (e.g., in an alternating manner). The neural-network training uses a training data set that includes expected output values of the neural network for respective input values 112.

During forward propagation 510, the input layer 502 receives input values 112 and uses them to generate output values that are provided to the hidden layer 504. The hidden layer 504, hidden layer 506, and output layer 508 repeat this process in turn, receiving the previous layer's output values as input values and generating respective output values (e.g., as described for the neural network 100, FIG. 1). In generating respective output values, the input layer 502 calls an activation function 512-1, the hidden layer 504 calls an activation function 512-2, the hidden layer 506 calls an activation function 512-3, and the output layer 508 calls an activation function 512-4. To call each activation function, function arguments are provided to the circuitry 300 (FIG. 3), or to a particular instance of the circuitry 300. In some embodiments, two or more of the activation functions 512-1 through 512-4 are the same function. For example, all of the layers use the same activation function except for the output layer 508, which uses a distinct activation function 512-4 (i.e., the activation functions 512-1, 512-2, and 512-3 are the same function, which is distinct from the activation function 512-4). The output values (i.e., activation-function values) generated by the output layer 508 during forward propagation 510 are cached in the cache memory 314 (FIGS. 3-4), in accordance with some embodiments. For example, the multiplexor 312 (FIGS. 3-4) provides the output values from the output layer 508 to the cache memory 314.

The output values from the output layer 508 for forward propagation 510 are compared (516) to the expected output values, and backward propagation 514 is performed using the results of this comparison. A difference value, which corresponds to the difference between the expected and actual output values, is provided to the output layer 508. The output layer 508 retrieves its activation-function values from forward propagation, along with its weights and biases, from the cache memory 314 (FIG. 3). A loss function is applied to the activation-function values in accordance with the difference value, and the weights and biases are updated accordingly. The updated weights and biases are cached in the cache memory 314 for use during the next round of forward propagation 510. This process is repeated for the hidden layers 506 and 504 until the weights and biases of the output layer 508 and hidden layers 506 and 504 have been updated and cached in the cache memory 314, at which point this round of backward propagation 514 is complete. The next round of forward propagation 510 (e.g., using a next group of input values 112 from the training set) is then performed, and the neural-network training 500 continues accordingly until the output values from the output layer 508 for forward propagation 510 converge with the expected output values.

Figure 6:
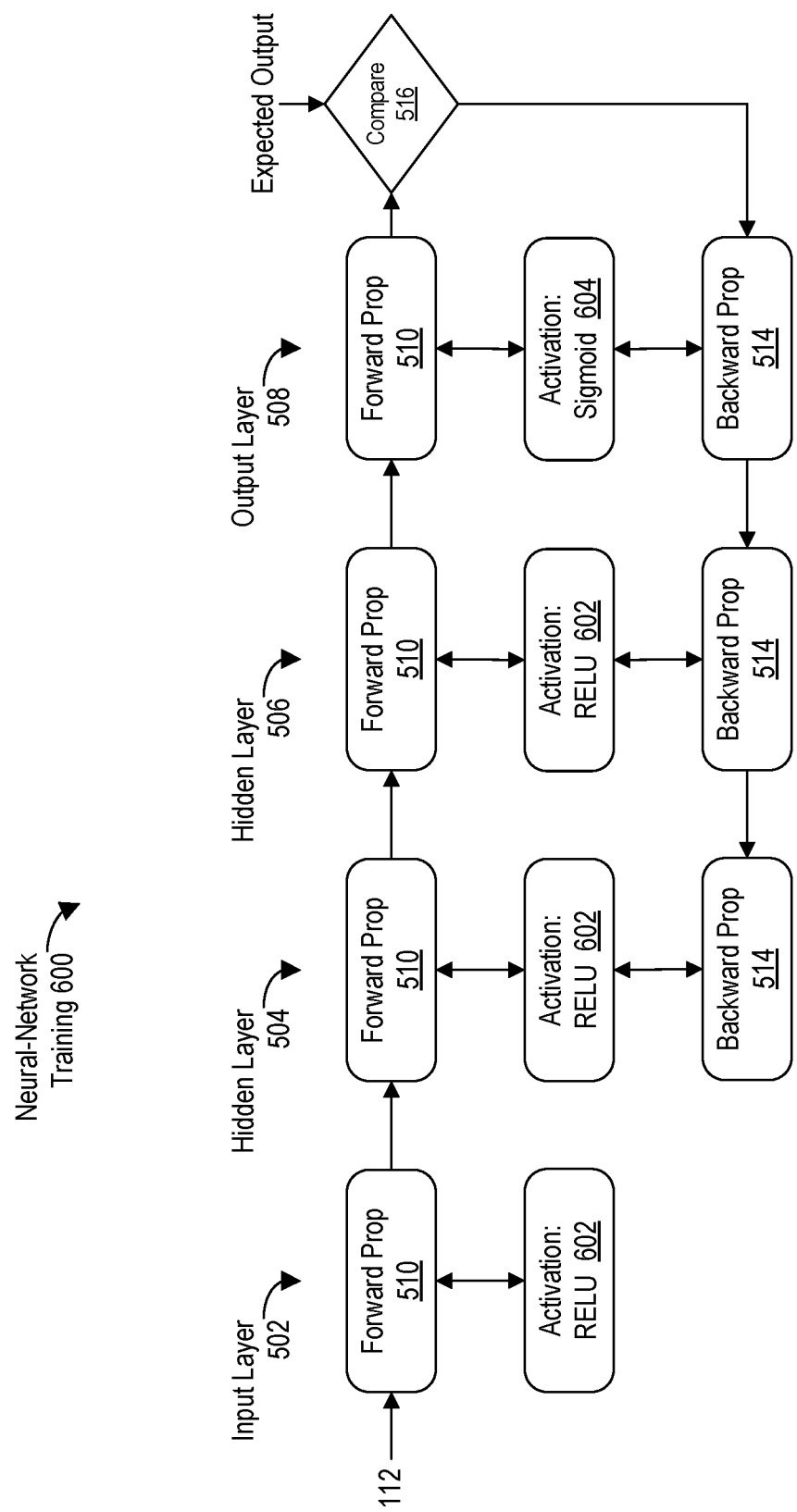
FIG. 6 shows an example of the neural-network training of FIG. 5, in accordance with some embodiments.

FIG. 6 shows neural-network training 600 that is an example of the neural-network training 500 (FIG. 5) in accordance with some embodiments. In the neural-network training 600, the activation functions 512-1, 512-2, and 512-3 for the input layer 502, hidden layer 504, and hidden layer 506 are a ReLU function 602. The activation function 512-4 for the output layer 508 is a sigmoid function 604. The activation functions for the neural-network training 600 are merely one example of the activation functions 512-1 through 512-4. Numerous other examples are possible.

Figure 7:
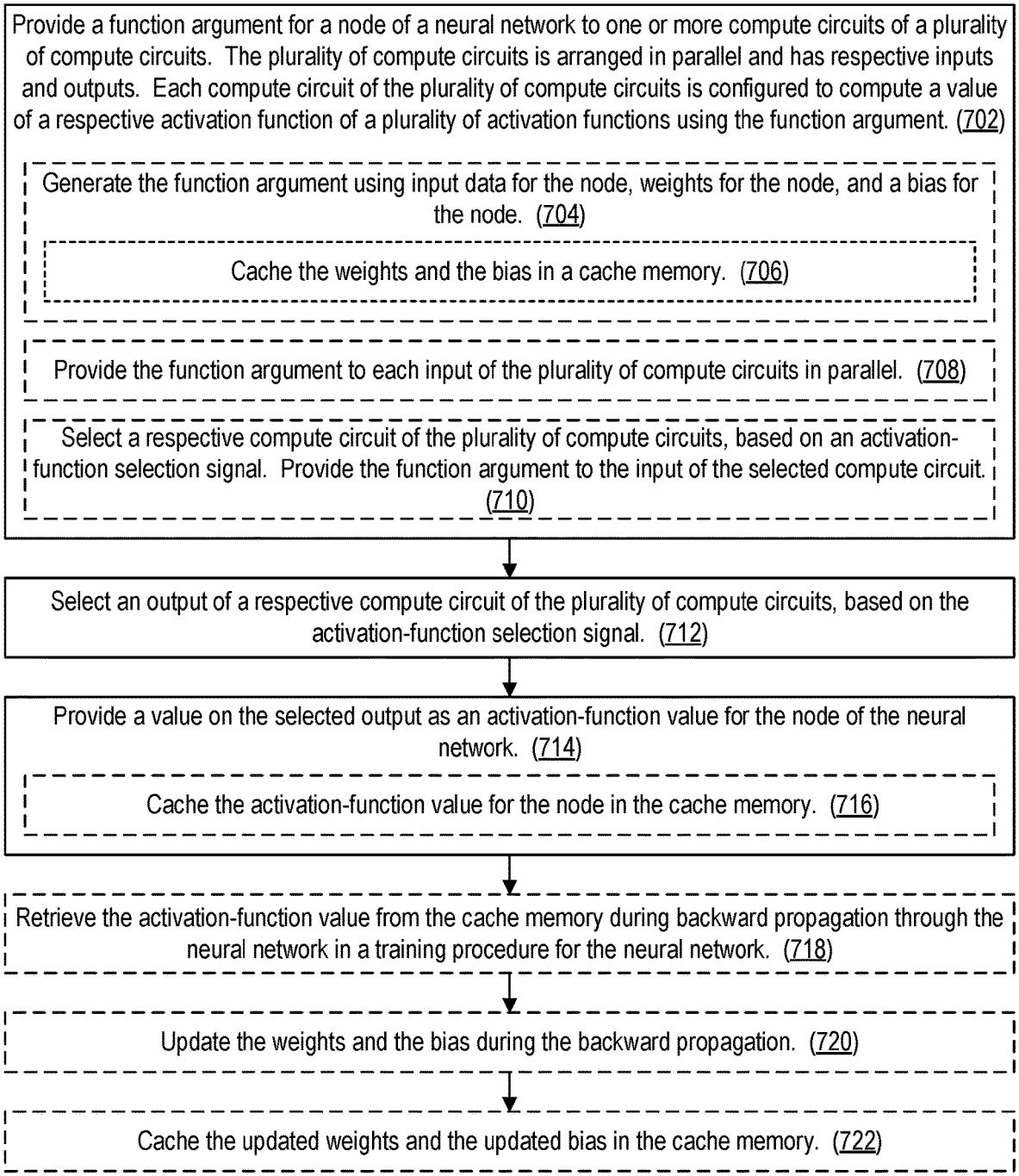
FIG. 7 is a flowchart showing a method of performing neural-network computations in accordance with some embodiments.

FIG. 7 is a flowchart showing a method 700 of performing neural-network computations in accordance with some embodiments. In the method 700, a function argument for a node (e.g., a node 110, FIG. 1; a neuron 200, FIG. 2) of a neural network (e.g., neural network 100, FIG. 1) is provided (702) to one or more compute circuits of a plurality of compute circuits (e.g., compute circuits 308-1 through 308-n, FIG. 3) (e.g., compute circuits 402, 404, 406, 408, and 410, FIG. 4). The plurality of compute circuits is arranged in parallel and has respective inputs and outputs (e.g., inputs 306 and outputs 310, FIGS. 3-4). Each compute circuit of the plurality of compute circuits is configured to compute a value of a respective activation function of a plurality of activation functions (e.g., activation functions 512-1 through 512-4, FIG. 5) (e.g., activation functions 602 and 604, FIG. 6) using the function argument. In some embodiments, a pre-processor (e.g., pre-processor 304, FIGS. 3-4) coupled to the inputs of the plurality of compute circuits provides the function argument to respective inputs of the one or more compute circuits.

In some embodiments, the function argument is generated (704) using input data (i.e., input values) for the node, weights for the node, and a bias for the node. For example, the pre-processor generates the function argument (e.g., in the module 206, FIG. 2). The weights and the bias may be cached (706) in a cache memory (e.g., cache memory 314, FIGS. 3-4).

In some embodiments, the function argument is provided (708) to each input of the plurality of compute circuits in parallel, at the same time. Alternatively, a respective compute circuit of the plurality of compute circuits is selected (710) based on an activation-function selection signal (e.g., activation-function selection signal 316, FIGS. 3-4), and the function argument is provided to the input of the selected compute circuit.

An output of a respective compute circuit of the plurality of compute circuits is selected (712), based on the activation-function selection signal (e.g., activation-function selection signal 316, FIGS. 3-4).

A value on the selected output is provided (714) as an activation-function value for the node of the neural network. In some embodiments, the activation-function value for the node is cached (716) in the cache memory. The cache memory may be used to implement a skip connection for the activation-function value.

In some embodiments, the activation-function value is retrieved (718) from the cache memory during backward propagation (e.g., backward propagation 514, FIGS. 5-6) through the neural network in a training procedure for the neural network. The weights and the bias are updated (720) during the backward propagation. The updated weights and the updated bias are cached (722) in the cache memory.

The method 700 (e.g., including providing the function argument in step 702, selecting an output in step 712, and providing the value on the selected output in step 714) may be performed for some or all of the neurons in a neural network. For example, a respective instance of the method 700 may be performed for a respective node in a first layer of the neural network. The first layer includes a plurality of nodes, and additional instances of the method 700 may be performed for each additional node, or for some of the additional nodes, in the first layer. Respective instances of the method 700 (e.g., each including providing the function argument in step 702, selecting an output in step 712, and providing the value on the selected output in step 714) thus may be performed for each node in the first layer or for a subset of the plurality of nodes in the first layer. In another example, respective instances of the method 700 (e.g., each including providing the function argument in step 702, selecting an output in step 712, and providing the value on the selected output in step 714) are performed for each node in multiple layers of the neural network (e.g., for each node in the first layer and each node in a second layer) (e.g., with each of the multiple layers having multiple nodes).

The circuitry 300 (FIG. 3) and the method 700 (FIG. 7) allow activation functions to be computed in a quick, computationally efficient, and low-power manner, by using dedicated compute circuits for specific activation functions. The circuitry 300 and the method 700 also can be used to compute multiple activation functions, since compute circuits for multiple activation functions are available in parallel. For example, the circuitry 300 and the method 700 may be used to change an activation function used in a deployed neural network.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. Circuitry for performing neural-network calculations, comprising:
   a plurality of compute circuits, arranged in parallel and having respective inputs and outputs, to receive function arguments for a node of a neural network on their respective inputs, compute values of a plurality of activation functions using the function arguments, and provide the values on their respective outputs, wherein each compute circuit of the plurality of compute circuits is to compute the values of a respective activation function of the plurality of activation functions;
   a pre-processor to provide the function arguments to the respective inputs of the plurality of compute circuits, the pre-processor comprising an input to receive input data for the node and processor circuitry to generate the function arguments using the input data, weights for the node, and a bias for the node; and
   a multiplexor to select between the respective outputs of the plurality of compute circuits and to provide the values on a selected output as activation-function values for the node of the neural network, based on an activation-function selection signal.

2. The circuitry of claim 1, wherein the pre-processor comprises a de-multiplexor to provide a respective function argument to a respective input of a selected compute circuit of the plurality of compute circuits, based on the activation-function selection signal.

3. The circuitry of claim 1, further comprising a cache memory, coupled to the multiplexor and the pre-processor, to store the activation-function values;
   wherein the pre-processor is to retrieve stored activation-function values from the cache memory during backward propagation through the neural network in a training procedure for the neural network.

4. The circuitry of claim 3, wherein the processor circuitry is to:
   cache the weights and the bias in the cache memory;
   retrieve the weights and the bias from the cache memory;
   update the weights and the bias during the backward propagation; and
   cache the updated weights and the updated bias in the cache memory.

5. The circuitry of claim 1, wherein:
   the node is a first node in a first layer of the neural network, the first layer comprising a plurality of nodes including the first node; and
   the pre-processor is to provide function arguments for the plurality of nodes of the first layer to one or more compute circuits of the plurality of compute circuits.

6. The circuitry of claim 1, wherein:
   the node is a first node in a first layer of the neural network, the first layer comprising a plurality of nodes including the first node; and
   the pre-processor is to provide function arguments for a subset of the plurality of nodes of the first layer to one or more compute circuits of the plurality of compute circuits, the subset comprising the first node.

7. The circuitry of claim 1, wherein:
   the node is a first node in a first layer of nodes of the neural network;
   the neural network comprises a plurality of layers of nodes, including the first layer and a second layer of nodes; and
   the pre-processor is to provide function arguments for the nodes of the first layer and the second layer to one or more compute circuits of the plurality of compute circuits.

8. The circuitry of claim 1, wherein the plurality of activation functions comprises activation functions selected from the group consisting of a sigmoid function, a hyperbolic tangent function, a rectified linear unit (ReLU) function, a leaky ReLU function, a max-pooling function, an average-pooling function, and a zero-activation function that provides all zeros.

9. The circuitry of claim 1, wherein:
   the plurality of activation functions comprises at least one of a sigmoid function or a hyperbolic tangent function; and
   the plurality of compute circuits comprises a compute circuit comprising a multiply-accumulate unit to calculate a Taylor-series approximation of the sigmoid function or the hyperbolic tangent function.

10. A method of performing neural-network calculations, comprising:
    using processor circuitry of a pre-processor, generating a function argument for a node of a neural network using input data for the node, weights for the node, and a bias for the node;
    providing the function argument for the node of the neural network from the pre-processor to one or more compute circuits of a plurality of compute circuits, wherein:
      the plurality of compute circuits is arranged in parallel and has respective inputs and outputs,
      the pre-processor is coupled to the inputs of the plurality of compute circuits,
      the pre-processor provides the function argument to respective inputs of the one or more compute circuits of the plurality of compute circuits, and
      each compute circuit of the plurality of compute circuits is configured to compute a value of a respective activation function of a plurality of activation functions using the function argument;
    selecting an output of a respective compute circuit of the plurality of compute circuits, based on an activation-function selection signal; and
    providing a value on the selected output as an activation-function value for the node of the neural network.

11. The method of claim 10, wherein providing the function argument from the pre-processor to the one or more compute circuits comprises providing the function argument from the pre-processor to each input of the plurality of compute circuits in parallel.

12. The method of claim 10, further comprising selecting a respective compute circuit of the plurality of compute circuits, based on the activation-function selection signal;
    wherein the pre-processor provides the function argument to the input of the selected compute circuit.

13. The method of claim 10, further comprising caching the activation-function value for the node in a cache memory.

14. The method of claim 13, further comprising retrieving the activation-function value from the cache memory during backward propagation through the neural network in a training procedure for the neural network.

15. The method of claim 14, further comprising:
caching the weights and the bias in the cache memory;
in the pre-processor, updating the weights and the bias during the backward propagation; and
caching the updated weights and the updated bias in the cache memory.

16. The method of claim 10, wherein:
the node is a respective node in a first layer of the neural network, the first layer comprising a plurality of nodes; and
the method further comprises performing the providing of the function argument, the selecting of the output, and the providing of the value for each node in the first layer.

17. The method of claim 10, wherein:
the node is a respective node in a first layer of the neural network, the first layer comprising a plurality of nodes; and
the method further comprises performing the providing of the function argument, the selecting of the output, and the providing of the value for a subset of the plurality of nodes in the first layer.

18. The method of claim 10, wherein:
the node is a respective node in a first layer of nodes of the neural network;
the neural network comprises a plurality of layers of nodes, including the first layer and a second layer of nodes; and
the method further comprises performing the providing of the function argument, the selecting of the output, and the providing of the value for each node in the first layer and each node in the second layer.

\* \* \* \* \*